United States Patent [19]

Sugiura et al.

[11] Patent Number: 5,058,955
[45] Date of Patent: Oct. 22, 1991

[54] SKIN COVERED FORMED PLASTIC SEAT

[75] Inventors: Takashi Sugiura; Ichiro Matsuura; Norio Yanagishita, all of Ayase, Japan

[73] Assignee: Ikeda Bussan Co., Ltd., Kanagawa, Japan

[21] Appl. No.: 410,121

[22] Filed: Sep. 20, 1989

[30] Foreign Application Priority Data

Apr. 25, 1987 [JP] Japan .................. 62-101155

[51] Int. Cl.$^5$ ............................................. B32B 3/06
[52] U.S. Cl. ................................ 297/452; 264/46.6; 297/218
[58] Field of Search .......... 297/452, DIG. 1, DIG. 2, 297/218; 156/216, 226, 245; 264/46.6

[56] References Cited

U.S. PATENT DOCUMENTS

| 3,431,331 | 3/1969 | Pincus et al. | 264/46.6 X |
| 4,089,919 | 5/1978 | Sanson | 264/46.6 |
| 4,385,090 | 5/1983 | Sims | 156/216 X |
| 4,738,809 | 4/1933 | Storch | 297/DIG. 1 X |

FOREIGN PATENT DOCUMENTS 101027  6/1983  Japan .................. 264/46.6

Primary Examiner—Peter R. Brown
Attorney, Agent, or Firm—Weiser & Stapler

[57] ABSTRACT

A skin covered foamed plastic seat capable of structurally preventing the appearance of creases due to the parting lines of the mold. The skin covered foamed plastic seat includes a skin cover including a surface skin to form an outer surface of the skin covered foamed plastic seat and a wadding to be laminated with the surface skin, the skin cover having end sections to be pinched in parting line portions of a mold for manufacturing the skin covered foamed plastic seat, at which the lamination of the wadding over the surface skin is weaker than that in remaining sections of the skin cover.

1 Claim, 1 Drawing Sheet

SKIN COVERED FORMED PLASTIC SEAT

BACKGROUND OF THE INVENTION

1. Field of the Invention

The present invention relates to a skin covered foamed plastic seat, to be used, for example, for car seat cushions and seat backs.

2. Description of the Background Art

Car seat cushions and seat backs have been made of a pad member covered by a skin cover. The pad member and the skin cover were used to be manufactured separately and combined together later, but it has become fashionable to manufacture a skin covered pad member altogether by making the foamed plastic inside the skin cover placed over a molding surface, so that the process of combining at later time may be omitted.

This is done by placing a skin cover over a lower mold and assembling the lower mold with an upper mold such that edges of the skin cover is pinched between parting lines between the upper mold and the lower mold, and then pouring liquid foam resin into a space between the upper mold and the lower mold which will become a pad member covered with the skin cover after the foaming process.

One of the difficult problem encountered in this manufacturing process is the appearance of creases on the surface of the skin cover at those portion placed in the parting lines.

FIG. 1 shows a conventional situation at a portion around a parting line in a mold for manufacturing a skin covered foamed plastic seat in which a parting line is formed by a portion 1a of a lower mold 1 and a portion 2a of an upper mold 2 which together pinch the edge of a skin cover 3 placed over the lower mold 1. The skin cover 3 is comprised of a surface skin 3a and a wadding 3b made of a foamed slav-urethane which is air permeable and impregnable. Thus, when the liquid foam resin is poured in, the wadding 3b is impregnated with the liquid foam resin which will subsequently stiffen as the foaming process progresses, and those portion of the skin cover 3 placed in the parting line will retain its pressed form, resulting in appearance of the creases which are difficult to remove afterwards and which damages the value of the skin covered foamed plastic seat as a product for sale.

SUMMARY OF THE INVENTION

It is therefore an object of the present invention to provide a skin covered foamed plastic seat capable of structurally preventing the appearance of creases due to the parting lines of the mold.

This object is achieved by the present invention by providing a skin covered foamed plastic seat, comprising: a skin cover including a surface skin to form an outer surface of the skin covered foamed plastic seat and a wadding to be laminated with the surface skin, the skin cover having end sections to be pinched in parting line portions of a mold for manufacturing the skin covered foamed plastic seat, at which the lamination of the wadding over the surface skin is weaker than that in remaining sections of the skin cover; and a pad member to be manufactured from liquid foam resin poured onto the skin cover placed over a molding surface of the mold.

Other features and advantages of the present invention will become apparent from the following description taken in conjunction with the accompanying drawings.

DETAILED DESCRIPTION OF THE PREFERRED EMBODIMENTS

Figure 1:
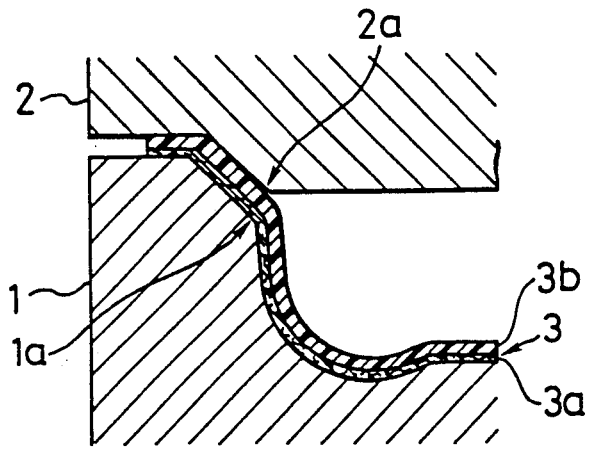
FIG. 1 is a magnified cross sectional view of a parting line of a mold for manufacturing a skin covered foamed plastic seat manufacturing a conventional skin covered foamed plastic seat.
Figure 2:
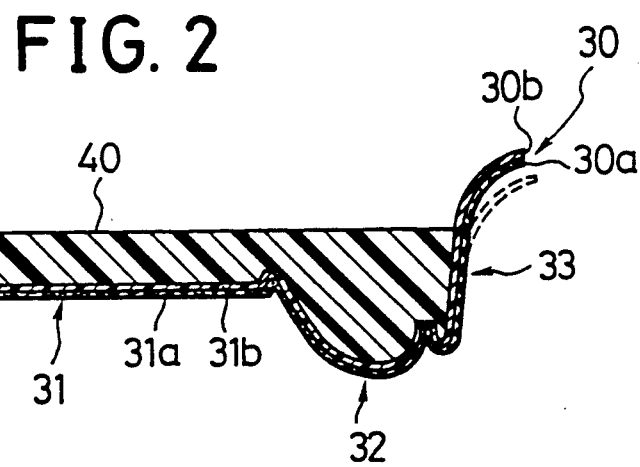
FIG. 2 is a cross sectional view of one embodiment of a skin covered foamed plastic seat according to the present invention.

Referring now to FIG. 2, there is shown one embodiment of a skin covered foamed plastic seat according to the present invention.

In this embodiment, the skin covered foamed plastic seat comprises a skin cover 30 and a pad member 40 covered by the skin cover 30, which will be fixed to a frame by fastening free ends of the skin cover 30 to the frame with clips.

The skin cover 30 is comprised of a surface skin 30a and a wadding 30b made of a foamed slav-urethane which is air permeable and impregnable, and is divided into a middle section 31, side sections 32, and end sections 33. Thus, the middle section 31 is comprised of a middle surface skin 31a of the surface skin 30a and a middle wadding 31b of the wadding 30b, each of the side sections 32 is comprised of a side surface skin 32a of the surface skin 30a and a middle wadding 32b of the wadding 30b, and each of the end sections 33 is comprised of an end surface skin 33a of the surface skin 30a and an end wadding 33b of the wadding 30b.

In all of the middle section 31, side sections 32 and end sections 33, the wadding 30b is laminated over the surface skin 30a. Here, unlike a conventional skin covered foamed plastic mold in which the lamination of the wadding 30b over the surface skin 30a would be uniform throughout all of the middle, side, and end sections, in this embodiment the end wadding 33b is laminated weakly over the end surface skin 33a at each of the end sections 33, in comparison with the lamination of the middle and side waddings 31b and 32b over the middle and side surface skins 31a and 32a at the middle and side sections 31 and 32, respectively. The lamination of the end wadding 33B over the end surface skin 33a is made to be so weak that the end surface skin 33a and the end wadding 33b can easily be taken apart at the end sections 33, as indicated by dashed line in FIG. 2.

Figure 3:
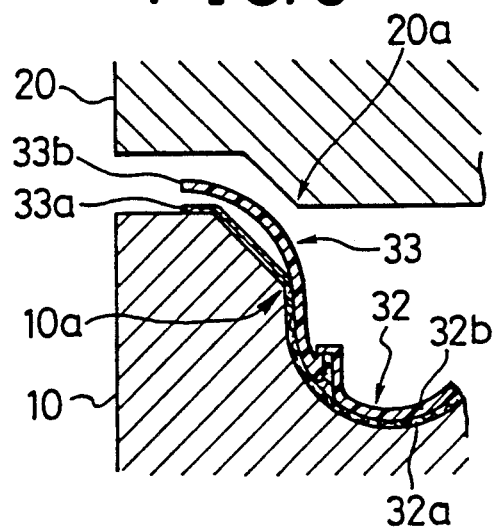
FIG. 3 is a magnified cross sectional view of a parting line of a mold for manufacturing a skin covered foamed plastic seat manufacturing the skin covered foamed plastic seat of FIG. 2.

As shown in FIG. 3, when this skin covered foamed plastic seat is to be manufactured by a mold, the skin cover 30 is to be placed over a lower mold 10 with each of the end sections 33 pinched in a parting line formed between a parting line portion 10a of the lower mold 10 and a parting line portion 20a of the upper mold 20, with the end surface skin 33a and the end wadding 33b taken apart.

Then, liquid foam resin will be poured into the assembled upper mold 20 and the lower mold 10. Here, the liquid foam resin to be poured into a space between the lower mold 10 and the upper mold 20 cannot go through the parting line so that the end sections 33 of the skin cover 30 beyond the region pinched in the parting line will be left as free ends, whereas the middle and side sections 31 and 32 of the skin cover 30 placed over the molding surface of the lower mold 10 will be combined with the pad member Here, a crease does appear along the parting line because of the compression of the end sections 33 there. However, since the end wadding 33b and the end surface skin 33a are separated at the end sections 33, only the end wadding 33b will permanently retain the crease as the foaming process of the liquid foam resin is completed so that when the free ends of the skin cover 30 are rolled around the pad member 40 and stretched, the crease on the surface skin 30a can easily be straightened.

Thus, in this embodiment of a mold for manufacturing a skin covered foamed plastic seat, the appearance of creases due to the parting lines of the mold is structurally prevented, and the damaging of the value of the skin covered foamed plastic seat as a product for sale is avoided.

It is to be noted that the weaker lamination at the end sections 33 in the above embodiment can be replaced by the end sections which are completely unlaminated, so that the end surface skin and the end wadding are separated without being taken apart at later time.

Besides this, many modifications and variations of the above embodiment may be made without departing from the novel and advantageous features of the present invention. Accordingly, all such modifications and variations are intended to be included within the scope of the appended claims.

What is claimed is:

1. A skin covered foamed plastic seat, comprising:

a skin cover including a surface skin to form an outer surface of the skin covered foamed plastic seat and a wadding laminated with the surface skin, the skin cover having end sections at which the laminated adherence between the wadding and the surface skin is weaker than that in remaining sections of the skin cover so that the skin cover and the wadding can be separated at the end sections while leaving the remaining sections in laminated adherence; and a pad member made from liquid foam resin and covered by the skin cover.

* * * * *